(12) United States Patent
Chen

(10) Patent No.: US 7,874,378 B2
(45) Date of Patent: Jan. 25, 2011

(54) VIBRATORY AND IMPACT CONNECTOR FOR A POWER TOOL

(76) Inventor: Bo-Shen Chen, No. 33-33, Lane 320, Sec. 1, Shatian Rd., Dadu Township, Taichung County 432 (TW)

( * ) Notice: Subject to any disclaimer, the term of this patent is extended or adjusted under 35 U.S.C. 154(b) by 65 days.

(21) Appl. No.: 12/505,496

(22) Filed: Jul. 19, 2009

(65) Prior Publication Data
US 2010/0044063 A1 Feb. 25, 2010

(30) Foreign Application Priority Data
Aug. 20, 2008 (TW) ................. 97131798 A

(51) Int. Cl.
| B25B 13/46 | (2006.01) |
| E02D 7/02 | (2006.01) |
| E21B 3/00 | (2006.01) |
| E21B 17/22 | (2006.01) |
| E21B 19/16 | (2006.01) |
| E21B 19/18 | (2006.01) |

(52) U.S. Cl. ............................ 173/29; 173/48; 173/217
(58) Field of Classification Search ................... 173/29, 173/48, 217
See application file for complete search history.

(56) References Cited

U.S. PATENT DOCUMENTS

| 5,842,527 A * | 12/1998 | Arakawa et al. ............... 173/48 |
| 6,691,796 B1 * | 2/2004 | Wu ............................. 173/48 |
| 7,225,884 B2 * | 6/2007 | Aeberhard ................. 173/93.5 |
| 7,308,948 B2 * | 12/2007 | Furuta .......................... 173/48 |
| 7,380,612 B2 * | 6/2008 | Furuta .......................... 173/29 |
| 7,380,613 B2 * | 6/2008 | Furuta .......................... 173/48 |
| 2005/0199404 A1 * | 9/2005 | Furuta et al. ................... 173/48 |
| 2007/0181319 A1 * | 8/2007 | Whitmine et al. ............. 173/48 |

\* cited by examiner

Primary Examiner—Rinaldi I Rada
Assistant Examiner—Robert F Long
(74) Attorney, Agent, or Firm—Banger Shia

(57) ABSTRACT

A vibratory and impact connector for a power tool is provided with a spring, a first drive rod, a drive ring and a second drive rod which are sequentially received in an outer cylinder. The first drive rod is inserted through the spring and extended out of the outer cylinder, the second drive rod is inserted through the drive ring and into the first drive rod, and the drive ring is fixed to the outer cylinder. By such arrangements, driving the second drive rod can rotate the outer cylinder, the first drive rod and the drive ring. Furthermore, by restricting the rotation of the outer cylinder, the drive ring can also be restricted from rotation, and the drive ring and spring can cooperate with a spring to drive the first drive rod to perform axial reciprocation, thus creating an impact operation.

6 Claims, 5 Drawing Sheets

VIBRATORY AND IMPACT CONNECTOR FOR A POWER TOOL

BACKGROUND OF THE INVENTION

1. Field of the Invention

The present invention relates to a portable power tool, and more particularly to a vibratory and impact connector for a power tool.

2. Description of the Prior Art

The existing portable power tools (such as electric drill) are mostly provided with a work head (such as a drill bit) which is rotated to drill holes or to screw/unscrew fasteners, and etc. Another type of power tool is provided with a work head which is capable of reciprocating in an axial direction to carry out vibratory and impact motion, which can substantially improve the drilling efficiency in concrete application.

In order to enable the work head to do the reciprocating motion, such a power tool has to be additionally provided with a vibratory impact mechanism, which increases the cost and makes the structure complicated.

Furthermore, for a buyer who doesn't use the impact function, a power tool inbuilt with a vibratory impact mechanism is not worthy of being bought.

The present invention has arisen to mitigate and/or obviate the afore-described disadvantages.

SUMMARY OF THE INVENTION

The primary object of the present invention is to provide a vibratory and impact connector for a power tool, which employs a second drive rod drive a first drive rod and a drive rod to rotate, and the first drive rod is connected with a work head. When the drive ring is restricted from rotation, it can still cooperate with a spring to drive the first drive rod to perform axial reciprocation, thus creating an impact operation.

To achieve the above object, a vibratory and impact connector for a power tool in accordance with the present invention comprises: an outer cylinder, a spring, a first drive rod, a drive ring and a second drive rod. The outer cylinder is defined in its bottom with a through hole, and the spring is received in the outer cylinder. One end of the first drive rod is inserted through the spring and extended out of the through hole of the outer cylinder to connect the work head, the other end of the first drive rod is defined with a plurality of protruding tapering teeth, the teeth of the first drive rod are spaced apart and annularly arranged. The drive ring is fixed in the outer cylinder and axially defined with a plurality of protruding and tapering teeth for engaging with the teeth of the drive rod. The second drive rod has one end inserted through the drive ring and into the first drive rod.

When the other end of the second drive rod is connected with and driven by a power tool, the second drive rod will drive the first drive rod, the drive ring and the outer cylinder to rotate, the end of the first drive rod extending out of the outer cylinder will drive the work head to rotate. When the outer cylinder and the drive ring are restricted from rotation, the drive ring will cooperate with the spring to make the teeth of the drive wing engage with and disengage from the teeth of the drive rod alternatively and repeatedly, as a result, the first drive rod will be caused to perform axial reciprocation, and the work head connected to the first drive rod will perform impact operation.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
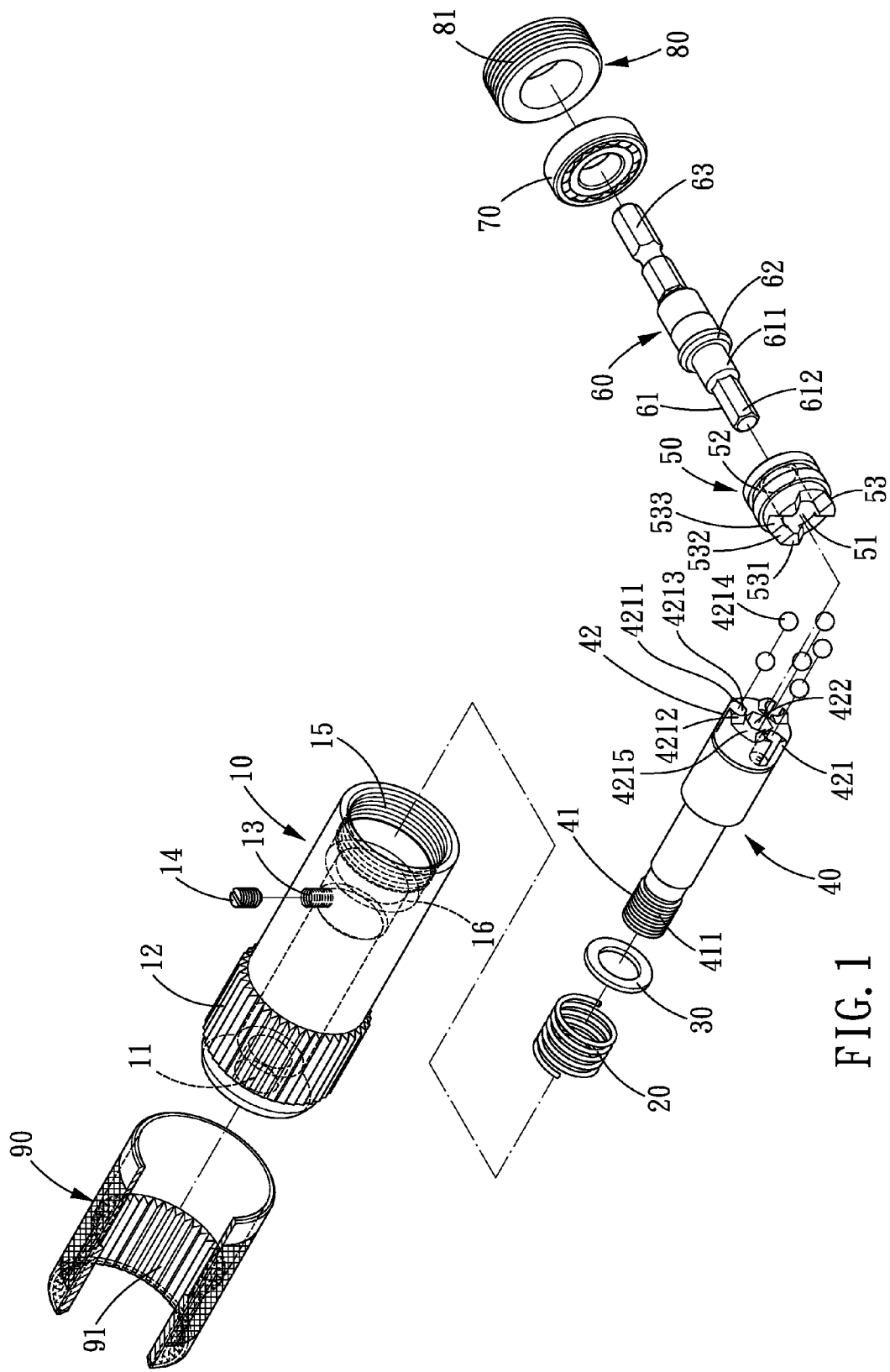
FIG. 1 is an exploded view of a vibratory and impact connector for a power tool in accordance with the present invention.
Figure 2:
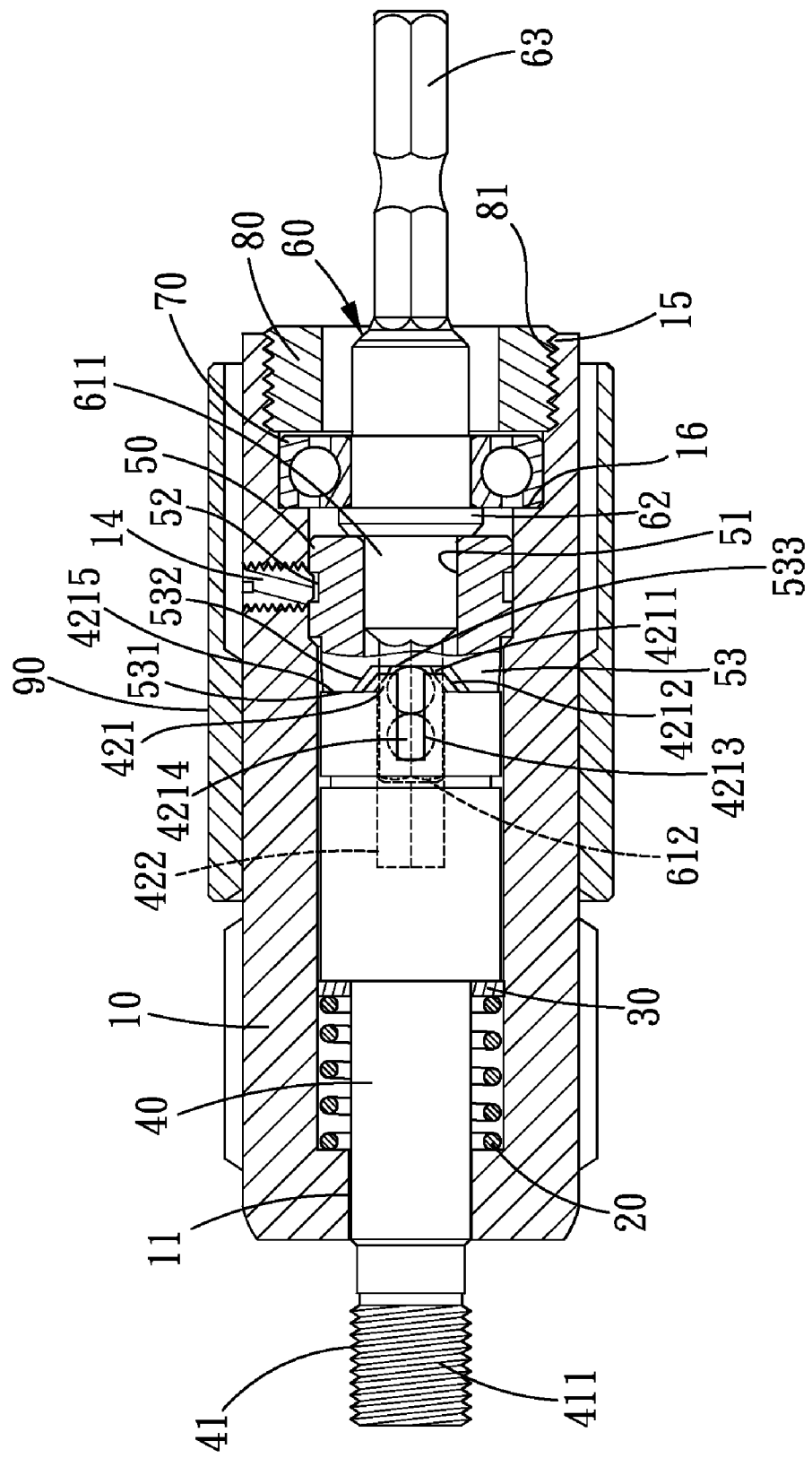
FIG. 2 is a cross sectional view of the vibratory and impact connector for a power tool in accordance with the present invention.

Referring to FIGS. 1 and 2, a vibratory and impact connector for a power tool in accordance with the present invention comprises: an outer cylinder 10, a spring 20, a stop ring 30, a first drive rod 40, a drive ring 50, a second drive rod 60, a bearing 70, an end ring 80 and a sleeve 90.

The outer cylinder 10 is axially defined in its bottom with a through hole 11 and is defined on its outer surface with a ring of protruding teeth 12 and a radial threaded hole 13 in which being screwed a bolt 14. On the inner surface of an upper open end of the outer cylinder 10 is formed an inner thread 15, and on the inner surface of the outer cylinder 10 is further defined an inner flange 16.

The spring 20 is received in the outer cylinder 10 and has one end abutted against the bottom of the outer cylinder 10.

The stop ring 30 is received in the outer cylinder 10 and abutted against the other end of the spring 20.

The first drive rod 40 is cylindrical-shaped and received in the outer cylinder 10 in such a manner that one end 41 of the first drive rod 40 is formed with outer thread 411 for engaging with a work head and inserted through the stop ring 30 and the spring 20 and out of the through hole 11 of the outer cylinder 10. The other end 42 of the first drive rod 40 is axially defined with a plurality of protruding tapering teeth 421 and a hexagonal inserting hole 422. The teeth 421 are spaced apart and annularly arranged around the inserting hole 422. Each of the teeth 421 includes a top surface 4211 and two oblique surfaces 4212, each top surface 4211 is axially defined with a slot 4213 for holding rolling balls 4214, and between each two neighboring teeth 421 is formed a connecting surface 4215.

The drive ring 50 is defined with a central circular hole 51 and provided with an annular groove 52 in its outer surface. The drive ring 50 is received in the outer cylinder 10 in such a manner that one end of the bolt 14 of the outer cylinder 10 is inserted in the annular groove 52 of the drive ring 50 so as to fix the drive ring 50 in the outer cylinder 10. One end of the drive ring 50 is axially defined with a plurality of protruding and tapering teeth 53 which are annularly arranged around the circular hole 51. Each of the teeth 53 includes a top surface 531 and two oblique surfaces 532, and between each two neighboring teeth 53 is formed a connecting surface 533. The teeth 53 of the drive ring 50 are engaged with the teeth 421 of the first drive rod 40 in such a manner that the rolling balls 4214 of the first drive rod 40 are abutted against the connecting surfaces 533 among the teeth 53 of the drive ring 50, while the top surfaces 531 of the drive rings 50 are abutted against the connecting surfaces 4215 of the first drive rod 40.

The second drive rod 60 includes a cylindrical section 611 and a hexagonal section 612 arranged from the middle portion thereof to one end 61 thereof, and the end 61 of the second drive rod 60 is inserted through the circular hole 51 of the drive ring 50 and into the inserting hole 422 of the first drive rod 40 in such a manner that the cylindrical section 611 of the second drive rod 60 is inserted in the circular hole 51 of the drive ring 50 while the hexagonal section 612 of the second drive rod 60 is inserted in the inserting hole 422 of the first drive rod 40. The second drive rod 60 is provided with a flange 62 at the middle portion thereof for pressing against the drive ring 50, and the other end 63 of the second drive rod 60 is hexagonal shaped in cross section for connection with a power tool.

The bearing 70 is received in the outer cylinder 10 and mounted on an outer periphery of the second drive rod 60 in such a manner that one end of the bearing 70 is abutted against the inner flange 16 of the outer cylinder 10 and the flange 62 of the second drive rod 60.

The end ring 80 is provided with an outer thread 81 on its outer surface and mounted on the outer periphery of the second drive rod 60 in such a manner that the other end 63 of the second drive rod 60 is inserted out of the end ring 80, the outer thread 81 of the end ring 80 is screwed with the inner thread 15 of the outer cylinder 10, and the end ring 80 is abutted against the other end of the bearing 70 so as to fix the bearing 70 into the outer cylinder 10.

The sleeve 90 is provided on its inner surface with teeth 91 for meshing with the teeth 12 of the outer cylinder 10 and is mounted on the outer periphery of the outer cylinder 10.

Figure 3:
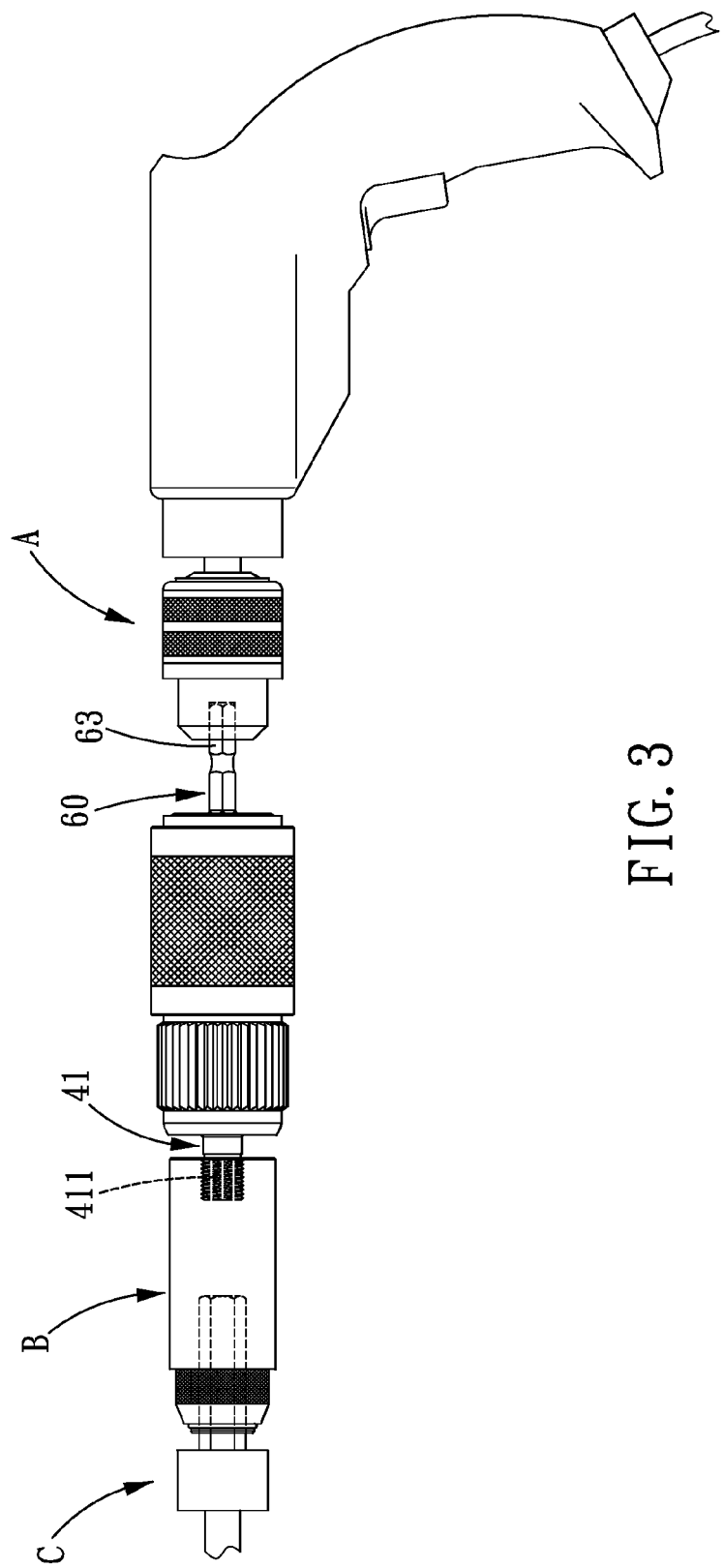
FIG. 3 shows that the vibratory and impact connector for a power tool in accordance with the present invention is assembled on a power tool and connected with a work head.

When in use, as shown in FIG. 3, the other end 63 of the second drive rod 60 is connected to a power tool A, and the outer thread 411 at the end 41 of the first drive rod 40 is screwed with an adapter B which is used to connect a work head C.

When the power tool A is turned on and drives the connector to rotate, the second drive rod 60 will drive the first drive rod 40 to rotate, consequently causing the rotation of the adapter B and the work head C connected to the first drive rod 40. Since the first drive rod 40 is engaged with the drive ring 50 via the teeth 421, 53, the drive ring 50 will also be caused to rotate, and finally the outer cylinder 10 will also be rotated since the driving ring 50 is fixed to the outer cylinder 10. At this moment, the power tool A works in a rotation mode.

Figure 4:
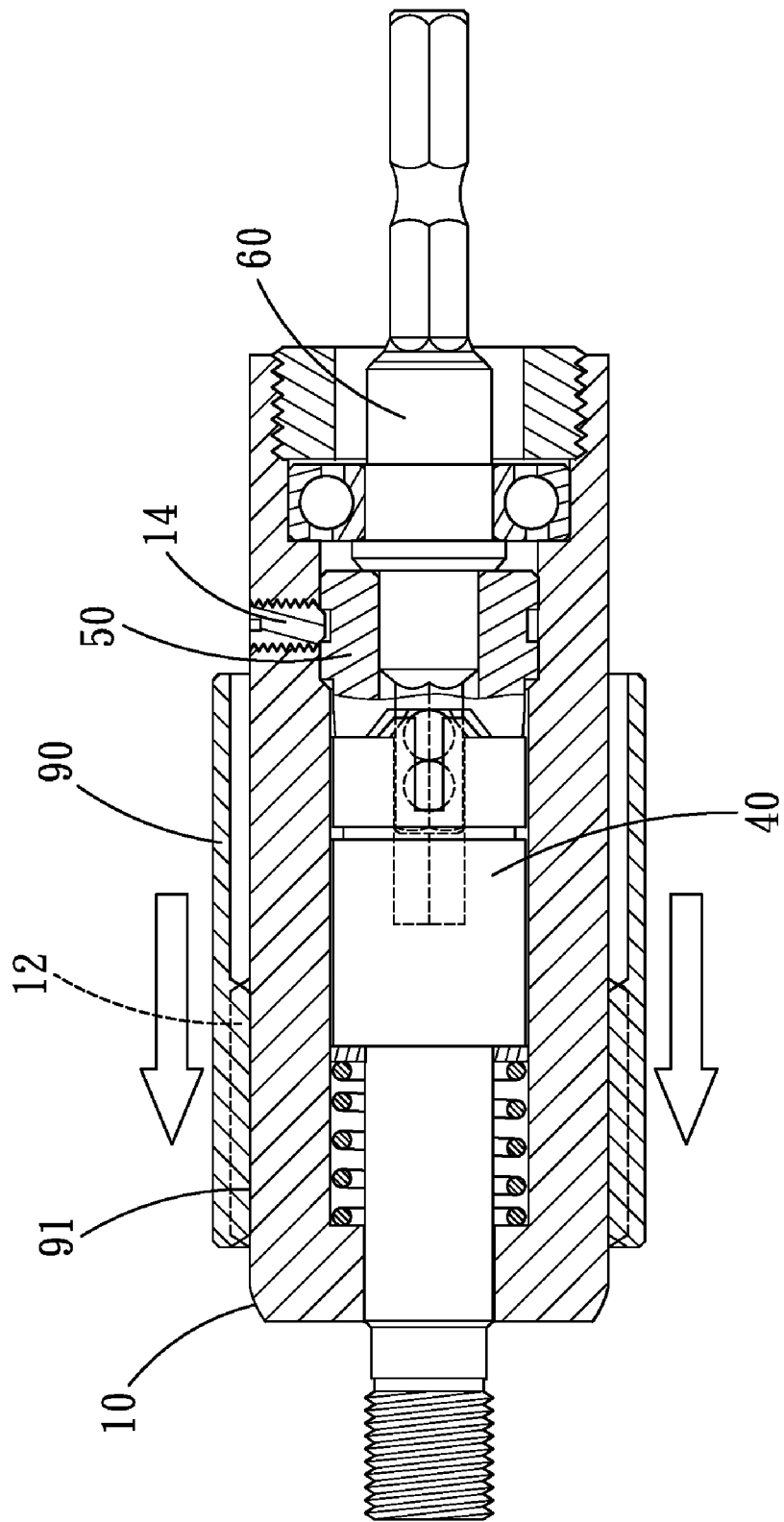
FIG. 4 shows that an outer cylinder of the vibratory and impact connector for a power tool in accordance with the present invention is engaged with the sleeve through their teeth.
Figure 5:
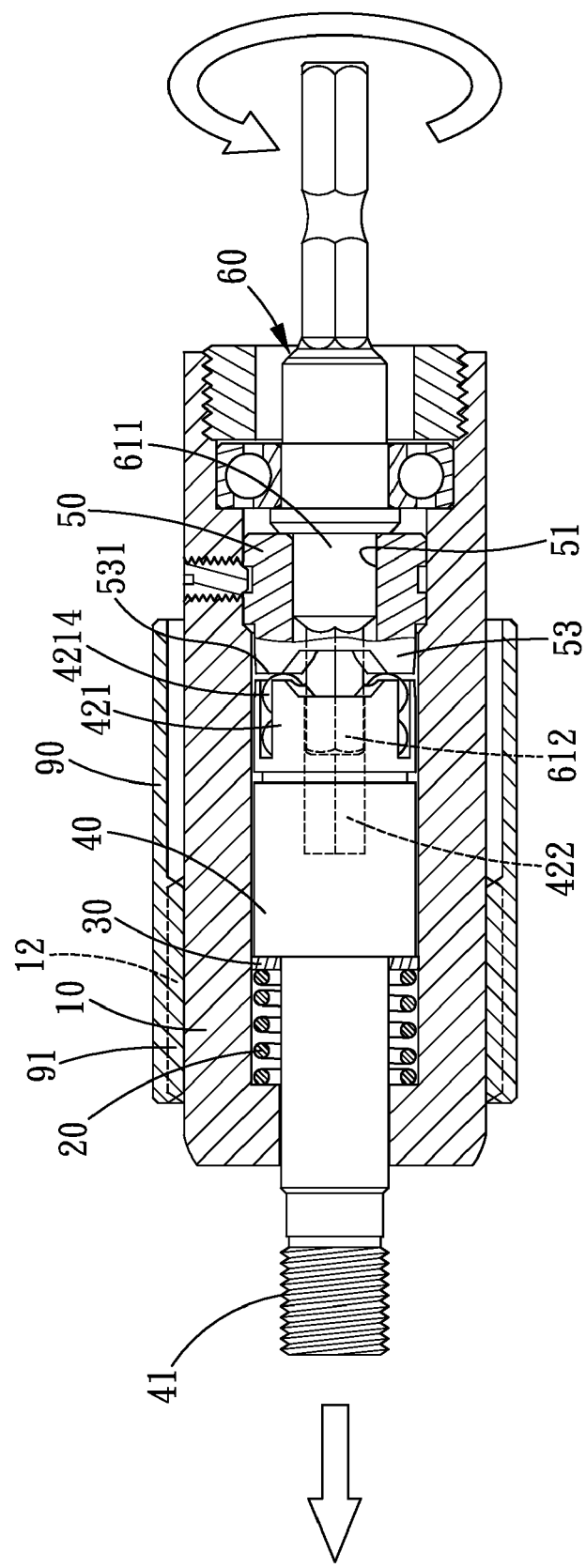
FIG. 5 shows that one end of the first drive rod of the vibratory and impact connector for a power tool in accordance with the present invention is extended out of the outer cylinder.

To set the power tool A into a impact mode, as shown in FIG. 4, the user can push the sleeve 90 outwards along the outer cylinder 10 to make the teeth 91 of the sleeve 90 engage with the teeth 12 of the outer cylinder 10, and the sleeve 90 can be rotated by the rotation of the outer cylinder 10. At this moment, restricting the rotation of the sleeve 90 with an external force can consequently stop the outer cylinder 10 and the drive ring 50 from rotating. Since the cylindrical section 611 of the second drive rod 60 is inserted in the circular hole 51 of the drive ring 50 while the hexagonal section 612 of the second drive rod 60 is inserted in the inserting hole 422 of the first drive rod 40, the second drive rod 60 can drive the first drive rod 40 to rotate with respect to the drive ring 50. When the teeth 421 of the first drive rod 40 rotate relative to the teeth 53 of the drive ring 50, one of the two oblique surfaces 4212 of each tooth 421 of the first drive rod 40 will be pressed against by one of the oblique surfaces 532 of each tooth 53 of the drive ring 50 and will thus push the stop ring 30 to compress the spring 20, as shown in FIG. 5, making the end 41 of the first drive rod 40 extend out of the outer cylinder 10, and thus allowing the first drive rod 40 to rotate while performing axial displacement, so that the teeth 421 of the first drive rod 40 will press against the top surfaces 531 of the teeth 53 of the drive ring 50.

When the second drive rod 60 continue driving the first drive rod 40 to rotate, the rolling balls 4214 of the teeth 421 of the first drive rod 40 will disengage from the top surfaces 531 of the teeth 53 of the drive ring 50, and the spring 20 will recover and push the end 41 of the first drive rod 40 back into the outer cylinder 10 again, making the rolling balls 4214 of the teeth 421 of the first drive rod 40 press against the connecting surfaces 533 among the teeth 53 of the drive ring 50 again, and thus allowing the first drive rod 40 to rotate while performing axial displacement, making the first drive rod 40 engage and disengage the drive ring 50 alternatively and repeatedly.

It is apparent from the above description that when the outer cylinder 10 is not restricted from rotating with respect to the drive ring 50, the first drive rod 40 is only able to rotate, so that the connected work head C can only rotate. When the outer cylinder 10 is restricted from rotating with respect to the drive ring 50, the first drive rod 40 is able to rotate while performing axial displacement, so that the connected work head C can only rotate while performing impacting operation.

While we have shown and described various embodiments in accordance with the present invention, it is clear to those skilled in the art that further embodiments may be made without departing from the scope of the present invention.

What is claimed is:

1. A vibratory and impact connector for a power tool being connecting to a power tool and a work head, comprising:
    an outer cylinder defined in its bottom with a through hole and defined on its outer surface with a ring of protruding teeth;
    a sleeve provided on its inner surface with teeth for meshing with the protruding teeth of the outer cylinder and mounted on an outer periphery of the outer cylinder;
    a spring received in the outer cylinder;
    a first drive rod received in the outer cylinder in such a manner that one end of the first drive rod is inserted through the spring and extended out of the through hole of the outer cylinder to connect the work head, the other end of the first drive rod is defined with a plurality of protruding tapering teeth and an inserting hole, the teeth of the first drive rod being spaced apart and annularly arranged around the inserting hole, each of the teeth including a top surface and two oblique surfaces, each top surface being axially defined with a slot for holding rolling balls, and between each two neighboring teeth of the first drive rod being formed a connecting surface;
    a drive ring received in the outer cylinder and defined with a central circular hole and a plurality of protruding and tapering teeth annularly arranged around the circular hole, each of the teeth of the drive ring including a top surface and two oblique surfaces, and between each two neighboring teeth of the drive ring being formed a connecting surface, the teeth of the drive ring being engaged with the teeth of the drive rod in such a manner that the rolling balls of the first drive rod are abutted against the connecting surfaces among the teeth of the drive ring; and a second drive rod having one end inserted through the circular hole of the drive ring and into the inserting hole of the first drive rod and having the other end of the second drive rod connected with the power tool, the second drive rod driving the first drive rod to rotate, the teeth of the driving ring engaging with the teeth of the outer cylinder, restricting the sleeve, the outer cylinder and the drive ring from rotation, making the rolling balls of the first drive rod press against the connecting surfaces among the teeth of the drive ring or the top surfaces of the teeth of the drive ring, so that the teeth of the drive ring are caused to engage with or disengage from the teeth of the first drive rod, and consequently, the work head connected to the first drive rod is caused to perform impact operation.

2. The vibratory and impact connector for a power tool as claimed in claim 1, wherein the outer cylinder is defined in its outer surface with a radial threaded hole in which being screwed a bolt, the drive ring is defined with an annular groove in its outer surface, one end of the bolt of the outer cylinder is inserted in the annular groove of the drive ring so as to fix the drive ring in the outer cylinder.

3. The vibratory and impact connector for a power tool as claimed in claim 1, wherein the spring has one end abutted against the bottom of the outer cylinder, a stop ring is received in the outer cylinder and abutted against the other end of the spring, the one end of the first drive rod is inserted through the stop ring and the spring and out of the through hole of the outer cylinder.

4. The vibratory and impact connector for a power tool as claimed in claim 1, wherein the inserting hole of the first drive rod is hexagonal in cross section, and the second drive rod includes a cylindrical section and a hexagonal section arranged from a middle portion thereof to one end thereof, the cylindrical section of the second drive rod is inserted in the circular hole of the drive ring while the hexagonal section of the second drive rod is inserted in the inserting hole of the first drive rod.

5. The vibratory and impact connector for a power tool as claimed in claim 1, wherein an inner flange is formed on an inner surface of the outer cylinder, the second drive rod is provided with a flange at a middle portion thereof for pressing against the drive ring, a bearing is received in the outer cylinder and mounted on an outer periphery of the second drive rod in such a manner that one end of the bearing is abutted against the inner flange of the outer cylinder and the flange of the second drive rod.

6. The vibratory and impact connector for a power tool as claimed in claim 5, wherein an inner thread is formed on an inner surface of an upper open end of the outer cylinder, an end ring is provided with an outer thread on its outer surface and mounted on the outer periphery of the second drive rod in such a manner that the other end of the second drive rod is inserted out of the end ring, the outer thread of the end ring is screwed with the inner thread of the outer cylinder, and the end ring is abutted against the other end of the bearing so as to fix the bearing into the outer cylinder.

* * * * *